United States Patent [19]

Sayko

[11] 4,387,383

[45] Jun. 7, 1983

[54] MULTIPLE NOZZLE INK JET PRINT HEAD

[75] Inventor: Steven P. Sayko, Dryden, N.Y.

[73] Assignee: NCR Corporation, Dayton, Ohio

[21] Appl. No.: 320,788

[22] Filed: Nov. 12, 1981

[51] Int. Cl.3 .................. G01D 15/18

[52] U.S. Cl. .................. 346/140 R

[58] Field of Search .................. 346/140, 75

[56] References Cited

U.S. PATENT DOCUMENTS 3,683,212 8/1972 Zoltan .................. 346/140 X 3,832,579 8/1974 Arndt .................. 346/75 X 4,189,734 2/1980 Kyser .................. 346/140 X 4,245,227 1/1981 Krause .................. 346/75

4,303,927 12/1981 Tsao .................. 346/75

*Primary Examiner*—Joseph W. Hartary

*Attorney, Agent, or Firm*—J. T. Cavender; Wilbert Hawk, Jr.; George J. Muckenthaler

[57] ABSTRACT

A print head includes a plurality of liquid droplet producing devices in an arrangement wherein the piezoelectric elements are in direct contact with the liquid. The piezo elements are pulsed on demand to cause rapid volume change in the compression chamber to initiate pressure waves therein and to eject ink droplets from the nozzles of the print head.

14 Claims, 7 Drawing Figures

1. EXCITED
0. NEUTRAL

\+ POSITIVE PULSE
0 0 POTENTIAL
− NEGATIVE PULSE

| A | B | C | D | E | F | G | | 1 | 2 | 3 | 4 | 5 | 6 | 7 | 8 |
|---|---|---|---|---|---|---|---|---|---|---|---|---|---|---|---|
| 1 | 0 | 0 | 0 | 0 | 0 | 0 | | − | 0 | 0 | 0 | 0 | 0 | 0 | 0 |
| 1 | 1 | 0 | 0 | 0 | 0 | 0 | | − | 0 | + | + | + | + | + | + |
| 1 | 1 | 1 | 0 | 0 | 0 | 0 | | − | 0 | + | 0 | 0 | 0 | 0 | 0 |
| 1 | 1 | 1 | 1 | 0 | 0 | 0 | | − | 0 | + | 0 | − | − | − | − |
| 1 | 1 | 1 | 1 | 1 | 0 | 0 | | − | 0 | + | 0 | − | 0 | 0 | 0 |
| 1 | 1 | 1 | 1 | 1 | 1 | 0 | | − | 0 | + | 0 | − | 0 | + | + |
| 1 | 1 | 1 | 1 | 1 | 1 | 1 | | − | 0 | + | 0 | − | 0 | + | 0 |
| | | | | | | | | | | | | | | | |
| 1 | 0 | 1 | 0 | 0 | 0 | 0 | | 0 | + | + | 0 | 0 | 0 | 0 | 0 |
| 1 | 0 | 1 | 1 | 0 | 0 | 0 | | 0 | + | 1 | 0 | − | − | − | − |
| 1 | 0 | 1 | 1 | 1 | 0 | 0 | | 0 | + | + | 0 | − | 0 | 0 | 0 |
| 1 | 0 | 1 | 1 | 1 | 1 | 0 | | 0 | + | + | 0 | − | 0 | + | + |
| | | | | | | | | | | | | | | | |
| 1 | 0 | 0 | 1 | 0 | 0 | 0 | | − | 0 | 0 | 0 | − | − | − | − |
| 1 | 0 | 0 | 1 | 1 | 0 | 0 | | − | 0 | 0 | 0 | − | 0 | 0 | 0 |
| 1 | 0 | 0 | 1 | 1 | 1 | 0 | | − | 0 | 0 | 0 | − | 0 | + | + |
| 1 | 0 | 0 | 1 | 1 | 1 | 1 | | − | 0 | 0 | 0 | − | 0 | + | 0 |
| | | | | | | | | | | | | | | | |

MULTIPLE NOZZLE INK JET PRINT HEAD

BACKGROUND OF THE INVENTION

In the field of non-impact printing, the most common types of printers have been the thermal printer and the ink jet printer. When the performance of a non-impact printer is compared with that of an impact printer, one of the problems in attaining high performance in the non-impact machine has been the control of the printing operation. As is well-known, the impact operation depends upon the movement of impact members such as wires or the like and which the typically moved by means of an electromechanical system which may, in certain applications, enable a more precise control of the impact members.

The advent of non-impact printing as in the case of thermal printing brought out the fact that the heating cycle must be controlled in a manner to obtain maximum repeated operations. Likewise, the control of ink jet printing in at least one form thereof must deal with rapid starting and stopping movement of the ink fluid from a supply of the fluid. In each case the precise control of the thermal elements and of the ink droplets is necessary to provide for both correct and high-speed printing.

In the matter of ink jet printing, it is extremely important that the control of the ink droplets be precise and accurate from the time of formation of the droplets to depositing of such droplets on paper or like record media and to make certain that a clean printed character results from the ink droplets. While the method of printing with ink droplets may be performed either in a continuous manner or in a demand pulse manner, the latter type method and operation is disclosed and is preferred in the present application as applying the features of the present invention. The drive means for the ink droplets is generally in the form of a crystal or piezoelectric type element to provide the high-speed operation for ejecting the ink through the nozzle while allowing time between droplets for proper operation. The ink nozzle construction must be of a nature to permit fast and clean ejection of ink droplets from the print head.

In the ink jet printer, the print head structure may be a multiple nozzle type with the nozzles aligned in a vertical line and supported on a print head carriage which is caused to be moved or driven in a horizontal direction for printing in line manner. The ink droplet drive elements or transducers may be positioned in a circular configuration with passageways leading to the nozzles. Alternatively, the printer structure may include a plurality of equally-spaced horizontally-aligned single nozzle print heads which are caused to be moved in back-and-forth manner to print successive lines of dots making up the lines of characters. In this latter arrangement, the drive elements or transducers are individually supported along a line of printing.

Since it is desirable to eliminate a curving transition section between the drive elements and the nozzles as in the case of the circular arrangement, it is proposed to provide an array of ink jet transducers in parallel manner for use in a compact print head.

Representative prior art in the field of ink jet print heads includes U.S. Pat. No. 3,373,437, issued to R. G. Sweet et al. on Mar. 12, 1968, which discloses a fluid droplet recorder with a plurality of jets and wherein a common fluid system supplies ink to an array of side-by-side nozzles.

U.S. Pat. No. 3,683,212, issued to S. I. Zoltan on Aug. 8, 1972, discloses an electro-acoustic transducer coupled to liquid in a conduit which terminates in a small orifice through which droplets of ink are ejected.

U.S. Pat. No. 3,750,564, issued to H. Bettin on Aug. 7, 1973, discloses a multiple nozzle ink jet print head having an ink chamber with opposed electrodes and insulating partitions to define capillary chambers. Ink drops are initiated by electrical forces of attraction and repulsion between the charged writing fluid in a capillary channel and electrodes of opposite polarity mounted on either end of the capillary channel.

U.S. Pat. No. 3,832,579, issued to J. P. Arndt on Aug. 27, 1974 discloses a pulsed droplet ejecting system wherein an electro-acoustic transducer applies a pressure pulse to the liquid in a reflection-free section of the transducer and sends a pressure wave to the nozzle to cause ejection of an ink droplet.

U.S. Pat. No. 4,005,440, issued to J. R. Amberntsson et al. on Jan. 25, 1977, discloses a printing head of smaller size and wherein the openings of the capillary tubes are located closer to one another.

U.S. Pat. No. 4,032,928, issued to J. T. White et al. on June 28, 1977, discloses a wide band ink jet modulation having a base and a nozzle plate spaced therefrom with a transducer, an electrode and a diaphragm axially positioned to cause droplets of ink to be ejected from an ink chamber and through the nozzle in the plate.

U.S. Pat. No. 4,096,626, issued to C. E. Olsen et al. on June 27, 1978, discloses a method of making a multilayer laminated charge plate for an ink jet printer wherein etched layers of photosensitive glass are provided with slots in the thickness of the layers for conductors.

U.S. Pat. No. 4,128,345, issued to J. F. Brady on Dec. 5, 1978, discloses a fluid impulse matrix printer having a two-dimensional array of tubes in a $5\times7$ matrix to print a complete character at a time.

U.S. Pat. No. 4,158,847, issued to J. Heinzl et al. on June 19, 1979 discloses a piezoelectric operated print head having twin columns of six nozzles.

And, U.S. Pat. No. 4,189,734, issued to E. L. Kyser et al. on Feb. 19, 1980 discloses a writing fluid source feeding drop projection means which ejects a series of droplets through a column of nozzles with sufficient velocity to traverse a substantially straight trajectory to the record medium.

SUMMARY OF THE INVENTION

The present invention relates to ink jet printers and more particularly, to a print head wherein liquid droplet producing devices are arranged in a compact stacked manner. In accordance with the present invention, there is provided an ink jet print head having a housing with a first cavity and a second cavity, a supply of ink in the first cavity and a plurality of ink droplet producing devices in the second cavity operable to initiate pressure waves in the ink and thereby eject ink droplets. The producing devices include piezoelectric elements or like transducers which are in direct contact with the fluid and when the elements are pulsed in succession an action occurs to cause rapid volume changes in the fluid chamber to initiate pressure waves and eject droplets of ink.

The multiple nozzle print head is made up of a number of the liquid droplet producing devices or spritzers which operate on the drop-on-demand or pulse-on-demand method or principle of printing with droplets of ink. The individual devices or spritzers are stacked in sandwich manner to form a compact print head with one piezoelectric element for each nozzle. The sandwich arrangement includes a conductive disk, a ring forming the ink chamber, and the piezoelectric element with the parts being designed in a circular shape. In this manner, the rapid volume reduction in the pressure chamber initiates a pressure wave which travels in all directions from the piezoelectric element.

In view of the above discussion, the principal object of the present invention is to provide an ink jet print head for generating droplets of ink on demand.

Another object of the present invention is to provide an ink jet print head of compact design having a plurality of droplet-producing devices.

An additional object of the present invention is to provide an ink jet print head having droplet-producing devices arranged to initiate pressure waves in the ink fluid which waves travel in all directions from the initiation element.

A further object of the present invention is to provide an ink jet print head of compact design wherein a plurality of fluid droplet-producing devices are formed in a stacked arrangement to provide for printing a line of characters at a time.

Still another object of the present invention is to provide an ink jet print head having a plurality of stacked transducers which are in direct contact with the ink to cause ejection of ink droplets from the print head.

Additional advantages and features of the present invention will become apparent and fully understood from a reading of the following description taken together with the annexed drawing.

DESCRIPTION OF THE PREFERRED EMBODIMENT

Figure 1:
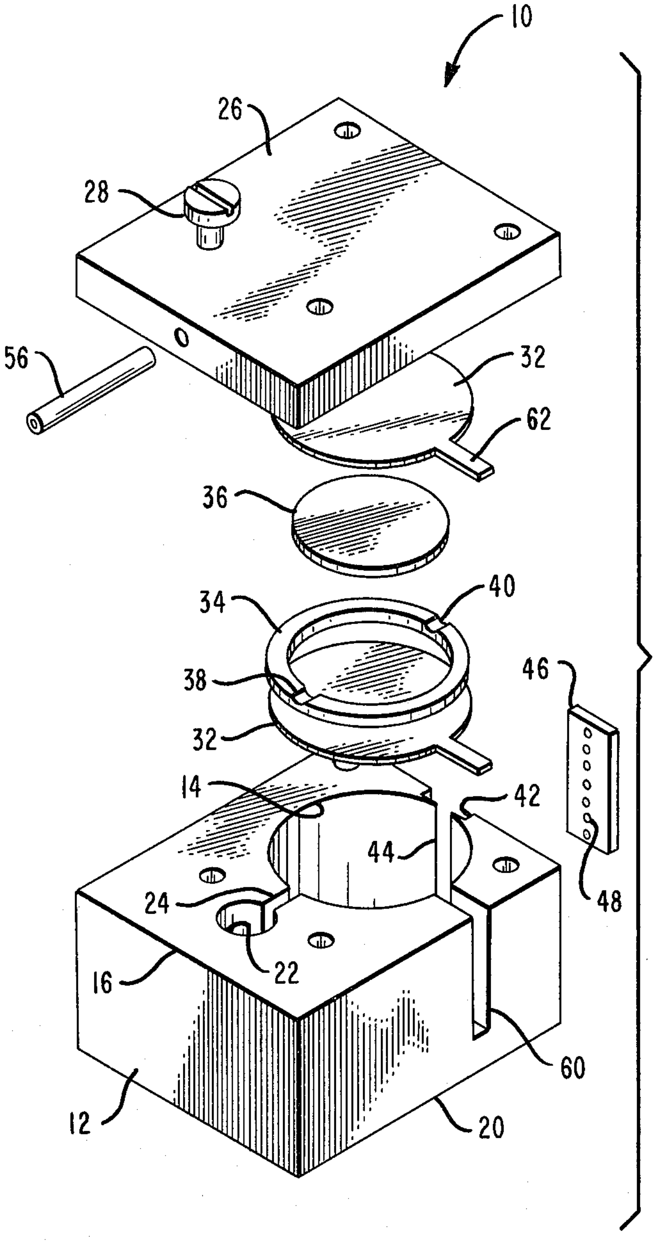
FIG. 1 is an exploded view of an ink jet print head showing the parts for one droplet-producing device only, in order to simplify the drawing.
Figure 2:
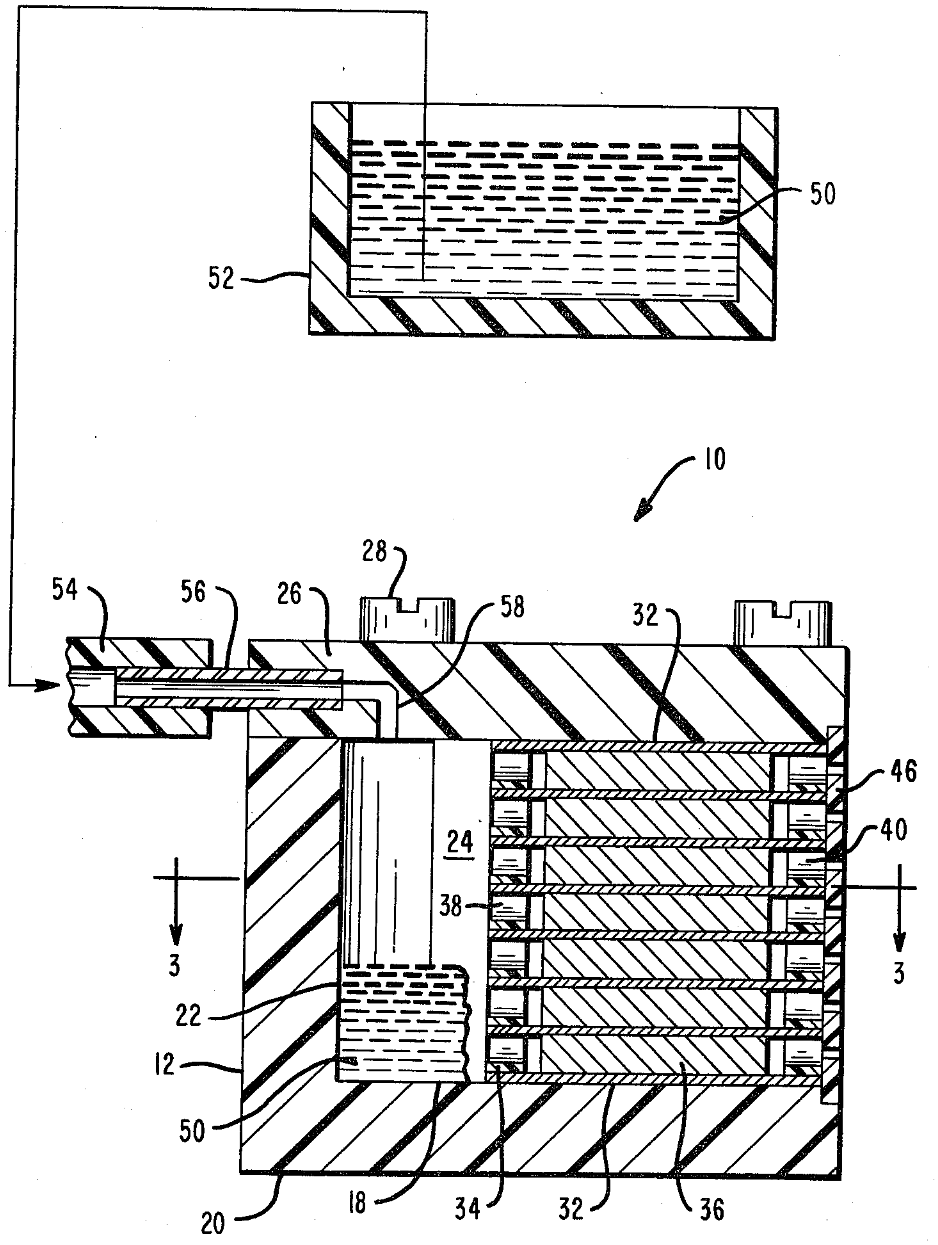
FIG. 2 is a side elevational view showing a plurality of the droplet-producing devices in a stacked arrangement.

Referring now to the drawing, FIGS. 1 and 2 show an arrangement for an ink jet print head generally designated as 10 having the capability of generating a plurality of droplets of printing ink or like liquid simultaneously. While initial work in the ink jet field was directed to a single nozzle drop-on-demand system which could produce a consistent and reliable formation and ejection of ink droplets, it is a desirable feature that the rate of droplet ejection be increased to compete with the high speed printers.

In a single nozzle construction, the term "ink spritzer" refers to a liquid droplet generating or producing device which generates a single droplet of ink per asynchronous excitation cycle. The spritzer also may be referred to as an ink jet head, a liquid droplet generator, a drop-on-demand ink jet, or more broadly may be termed a squirter or sprayer.

It is seen that the multiple nozzle print head provides one means for increasing the rate of ink droplets, however, other things such as higher cost, larger size, smaller production capability and reduced performance must be considered when weighing one form of print head against another form. In this respect, however, the subject matter and arrangement of the present invention is considered to be a viable design for ink jet printers of the drop-on-demand multiple nozzle type.

It is well-known in the art that the drop-on-demand ink jet devices include several common and similar features or components such as a fluid supply reservoir, a supply line or tube from the reservoir to the spritzer and a fluid inlet to the spritzer. Other common features or components may include a fluid compression chamber, a piezoelectric crystal or transducer type volume changer, and the nozzle orifice. The arrangement of these components may be influenced by the design of the print head wherein the compression chamber, as the major volume cavity for the printing ink or like fluid in the spritzer body is coupled with the piezo transducer, which can rapidly change its volume within the chamber, to initiate the pressure waves to produce a droplet of ink at the nozzle orifice. Matters of interest in the design of the print head are directed to the fact that the volume of the compression chamber should be held to a minimum without restricting the required fluid flow path. In a smaller chamber, the piezo crystal is required to effect a smaller change in volume to generate pressure waves for ejection of ink droplets. Another matter of interest is that the piezo transducer may be assembled to produce a bender bimorph cell in manner wherein two crystal elements operate in rigid combination to change the volume in the chamber. A single piezo element or transducer may also be used by itself as a volume changer. Also, it is a matter of design wherein the nozzle orifice is generally in the range of 40–100 micrometers in diameter and is approximately cylindrical in length for 2–4 times the diameter.

The ink jet print head 10 includes a housing or body 12 of generally rectangular configuration in a preferred embodiment thereof and made of plastic material and is formed with a circular cavity 14 which is offset from the center of the housing and extending from the top of the housing to a plane 18 spaced from the base 20. Of course the housing or body 12 may be ellipsoidal or any other practical shape to contain the various parts of the print head. A second circular cavity 22 of smaller diameter is formed in the housing and also extends from the top of the housing to the plane 18 and is in communication or connected with the cavity 14 by means of a slot 24. A cover 26 is secured to the housing 12 by means of screws 28.

The cavity 14 contains a plurality of liquid droplet generating devices or spritzers which are made up of a metallic conductive disk, a plastic ring forming a chamber for liquid and a piezo crystal element.

Referring to FIG. 1, a conductive disk 32 is placed into the cavity 14 along with a plastic ring 34 and a piezo crystal element or transducer 36.

FIG. 2 shows a plurality of the spritzers which include seven in the preferred arrangement and wherein the seven devices utilize seven plastic rings 34, seven piezo crystals 36 and eight conductive disks 32. Each of the rings 34 has a pair of recesses 38 and 40 in opposed manner across the diameter of the ring for providing flow of liquid from the small cavity 22 to the print head nozzles. The housing 12 has a rectangular recess 42 in one side thereof opposite across the cavity 14 from the cavity 22 and a slot 44 connects the cavity 14 and the recess 42. A nozzle plate 46 having seven nozzles 48 is secured by well-known means such as by bonding in the recess 42.

The writing fluid 50 is an ink of low electrical conductivity and is contained within a reservoir 52 which is connected by means of a supply tube 54 and a coupling tube 56 through which the ink flows in turn through a passageway 58 in the cover 26 to the cavity 22.

Figure 3:
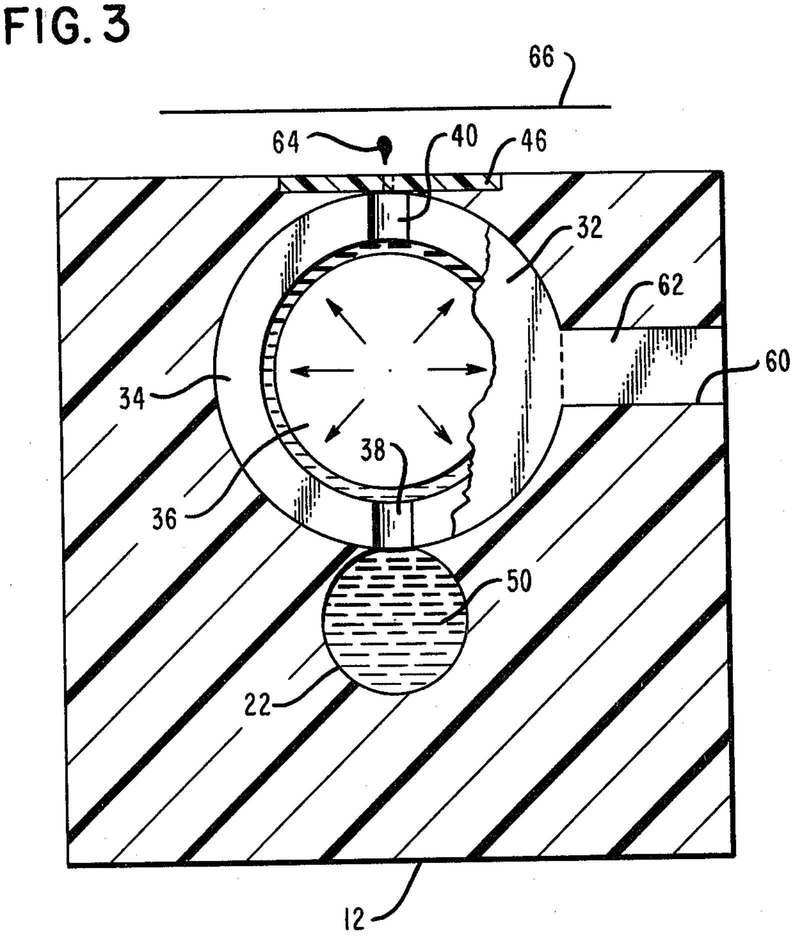
FIG. 3 is a view taken along line 3—3 of FIG. 2.

FIG. 3 is a horizontal sectional view of the housing 12 showing the ink 50 in the cavity 22, the chamber ring 34 and the piezo crystal element in the cavity 14. A vertical channel or slot 60 is also provided in the side of the housing 12 for terminals 62 of the conductive disks 32. The piezo element 36 is pulsed to generate a pressure wave in the direction of the arrows and to cause ejection of an ink droplet 64 through an orifice in the nozzle plate 46 and onto the record media 66.

Figure 4:
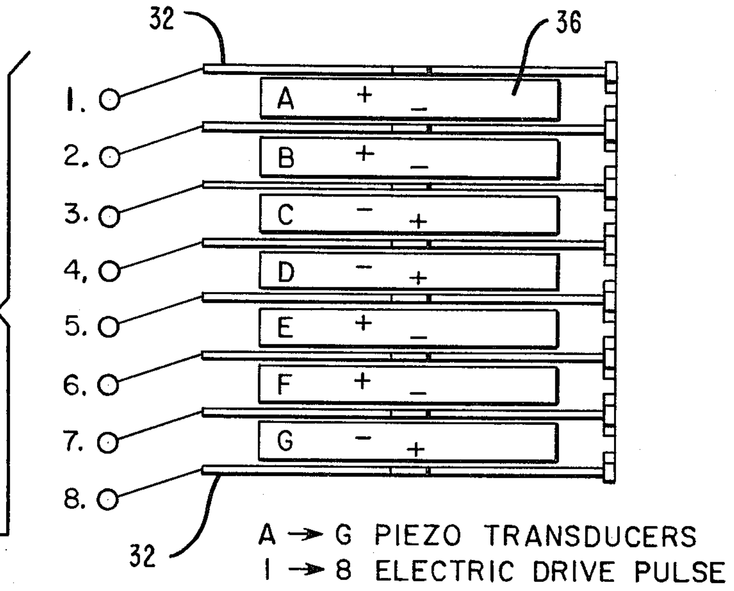
FIG. 4 is a diagrammatic view showing the stacked assemblies along with a matrix diagram of several excitation states and the associated voltage pulses.

FIG. 4 shows the stacked arrangement of the spritzers and including the conductive disks 32 and the piezo crystals 36. The included chart shows several pulsing combinations and also the necessary voltage combinations using the letters A–G for the piezo elements and numerals 1–8 for the drive pulses.

Figure 5:
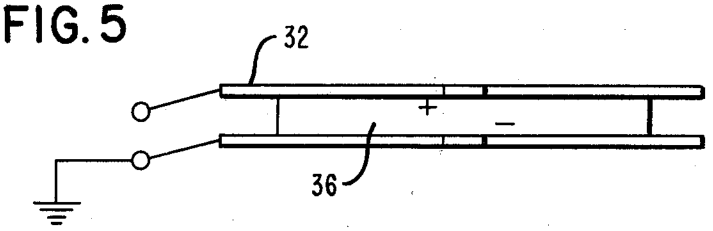
FIG. 5 is a connection diagram for a single piezoelectric element.

FIG. 5 is a connection diagram for a single piezo element 36 with conductive disks 32 on either side thereof. The lower disk 32 is connected to a common ground zero with respect to the voltage pulses later described in FIGS. 6 and 7, which voltage pulses are coupled to the upper conductive disk 32 in FIG. 5.

Figure 6:
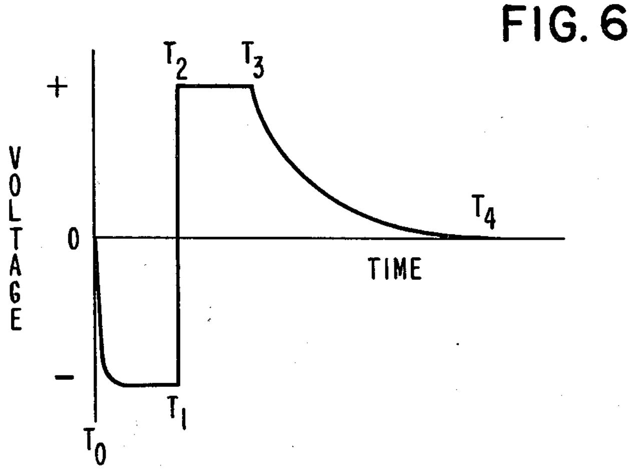
FIG. 6 is a diagram showing the preferred voltage pulse for the element.
Figure 7:
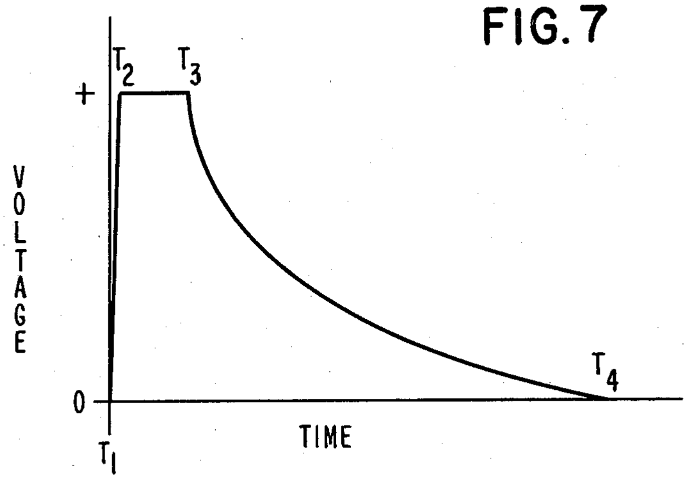
FIG. 7 is a diagram of an unusually large voltage contrasted with the diagram of FIG. 6.

FIG. 6 is a diagram of a preferred or desired positive voltage pulse connected to the upper conductive disk 32 of FIG. 5 and is contrasted with the diagram of FIG. 7 wherein the voltage across the disks is undesirably large for a spritzer of the disclosed type. Disk 32 is connected to the voltage pulse source and the opposite disk 32 on the other side of crystal 36 is connected to ground. The negative voltage pulse $t_0-t_1$ causes the piezoelectric crystal or transducer 36 to contract and the positive voltage pulse rapidily rising from $t_1$ to $t_2$ causes the crystal 36 to expand and thereby initiate flow of ink. When the negative voltage is precisely equal to the positive voltage, the maximum potential across the disks 32 is one-half the peak-to-peak potential. In this respect, the operation is such that the potential is maintained in a limited manner as shown in the amplitude from the negative voltage to the positive voltage shown in FIG. 6 and as contrasted with the much higher positive voltage shown in FIG. 7. The higher positive voltage is an undesirably large potential for the type and style of the ink spritzer disclosed in this invention.

The time of the positive voltage pulse $t_2-t_3$ enables the piezo crystal 36 to be expanded for an ink droplet to form and the time from $t_3$ to $t_4$ is the fall time sufficient to cause a negative ink flow and enable the ink droplet to break cleanly from the nozzle orifice.

In the operation of the ink jet print head, it is of course essential that a single spritzer or all seven spritzers can be operated at any one time. The ink 50 travels from the reservoir 52 through the tubes 54 and 56 and through the passageway 58 into the cavity 22. The ink enters into the compression chamber between the outside diameter of the piezo crystal 36 and the chamber ring 34 in the form of a thin annulus through the channels 38 and 40 in the ring 34. The ink enters the compression chamber, fills the annulus and into the molded channel of the chamber ring from where the ink enters the channel to the nozzle plate 46. The electrical excitation of the piezo element 36 from the outside pulse source through the conductive disk 32 causes a rapid radial volume change as shown by the arrows in FIG. 3 and the expansion of the piezo crystal 36 causes the ink to flow in all directions. The flow of ink in the direction of the nozzle plate 46 is of sufficient energy to cause ejection of droplets of ink through the nozzle orifice 48 in the plate.

It is thus seen that herein shown and described is a multiple nozzle ink jet print head wherein the ink droplet producing or generating devices are arranged in a compact stacked configuration and wherein the piezoelectric crystals or transducers are in direct contact with the ink. The arrangement and structure enables the accomplishment of the objects and advantages mentioned above, and while a preferred embodiment has been disclosed herein, variations thereof may occur to those skilled in the art. It is contemplated that all such variations and modifications not departing from the spirit and scope of the invention hereof are to be construed in accordance with the following claims.

I claim:

1. An ink jet print head comprising a
- housing having a first cavity and a second cavity connected therewith, a
- supply of ink in said first cavity, and a
- plurality of ink droplet producing devices positioned in said second cavity, each of said devices comprising a conductive element, an annular element forming a chamber for containing ink in said second cavity, and a transducing element in contact with the ink in said chamber and operable to initiate pressure waves in the ink and thereby cause ejection of ink droplets from said print head.

2. The print head of claim 1 wherein said first cavity and said second cavity are cylindrical shaped and communicate with one another.

3. The print head of claim 1 wherein said plurality of devices are circular formed and positioned in stacked manner in said second cavity.

4. The print head of claim 1 wherein said housing includes a member having a plurality of nozzles therein corresponding to the ink droplet producing devices.

5. The print head of claim 1 wherein said housing includes a channel connecting said first cavity and said second cavity.

6. The print head of claim 1 wherein said conductive element comprises a disk associated with and positioned on either side of said transducing element.

7. The print head of claim 1 wherein said annular element comprises a ring having channels in the periphery thereof for carrying ink through said second cavity.

8. The print head of claim 1 wherein said transducer element is a piezoelectric crystal in contact with said ink.

9. A compact print head for receiving ink from a supply thereof and for ejecting droplets of ink on record media comprising a
- housing having a cavity therein,
- means defining a plurality of nozzles connected with the cavity, and ink droplet generating apparatus positioned in said cavity and comprising a plurality of conductive elements with an annular chamber and a transducing element therebetween, said transducing element being in contact with the ink and initiating pressure waves for causing ejection of droplets of ink through said nozzles.

10. The print head of claim 9 including a second cavity within said housing and connected with said first mentioned cavity.

11. The print head of claim 9 wherein said plurality of conductive elements are circular formed and positioned in stacked manner in said cavity.

12. The print head of claim 9 wherein said conductive element comprises a disk associated with and positioned on either side of said transducing element.

13. The print head of claim 9 wherein said annular chamber comprises a ring having channels in the periphery thereof for carrying ink through said cavity.

14. The print head of claim 9 wherein said transducer element is a piezoelectric crystal in contact with the ink.

* * * * *